April 29, 1941.  W. E. URSCHEL  2,240,273
SPINACH HARVESTING MACHINE
Filed April 15, 1939  4 Sheets-Sheet 3

INVENTOR
William E. Urschel
BY
ATTORNEY

April 29, 1941.  W. E. URSCHEL  2,240,273
SPINACH HARVESTING MACHINE
Filed April 15, 1939  4 Sheets-Sheet 4

INVENTOR
William E. Urschel
BY
ATTORNEY

Patented Apr. 29, 1941

2,240,273

UNITED STATES PATENT OFFICE 2,240,273

SPINACH HARVESTING MACHINE

William E. Urschel, Valparaiso, Ind.

Application April 15, 1939, Serial No. 268,084

10 Claims. (Cl. 56—157)

This invention has to do with a harvesting machine for a row crop as spinach and relates more particularly to an improved gathering apparatus therefor.

The primary object of the present invention is the provision of an improved gathering apparatus for a row crop harvesting machine that is adapted to gather the stalks and leaves of the crop by cutting the same close to the ground and efficiently convey and deposit the same in suitable receptacles.

Another object of the invention is the provision of a machine comprising a plurality of gathering apparatuses or assemblies which are adjustable to coincide with differently spaced row centers.

Another object of the invention is the provision of a machine of the above type employing crop gathering belts and wherein a plurality of driving pulleys are effective for driving each of said belts.

Still another object of the present invention is the provision of a machine as the above which is inherently light in weight and thus easily manipulated in soft soil, as that usually present in cultivated fields.

Other desirable objects of the invention will become apparent when reading the following description with reference to the accompanying four sheets of drawings, wherein:

Fig. 8 is a sectional view taken on the line 8—8 of Fig. 2; and

Figure 1:
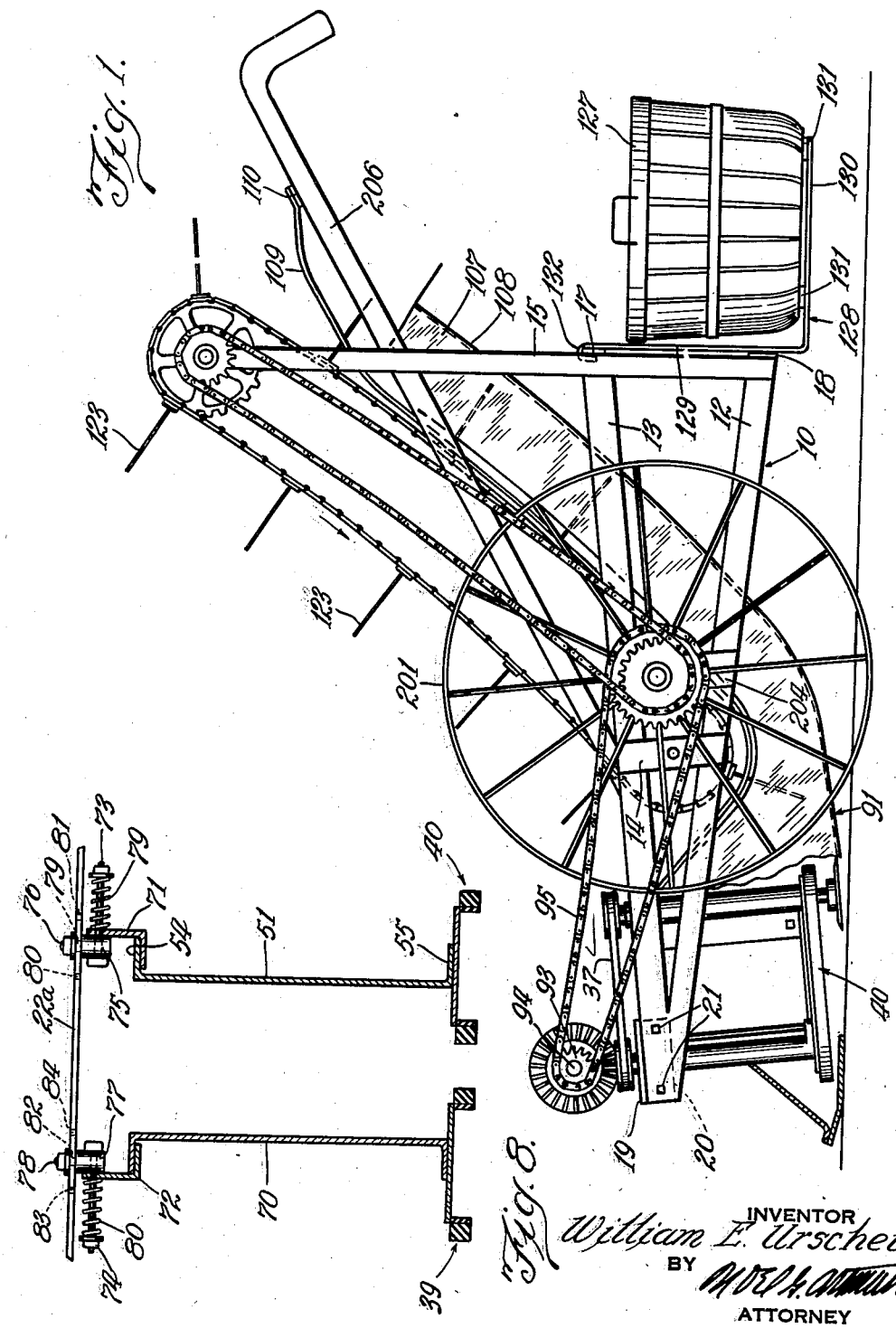
Fig. 1 is a side elevation of a machine embodying the principles of the present invention.
Figure 2:
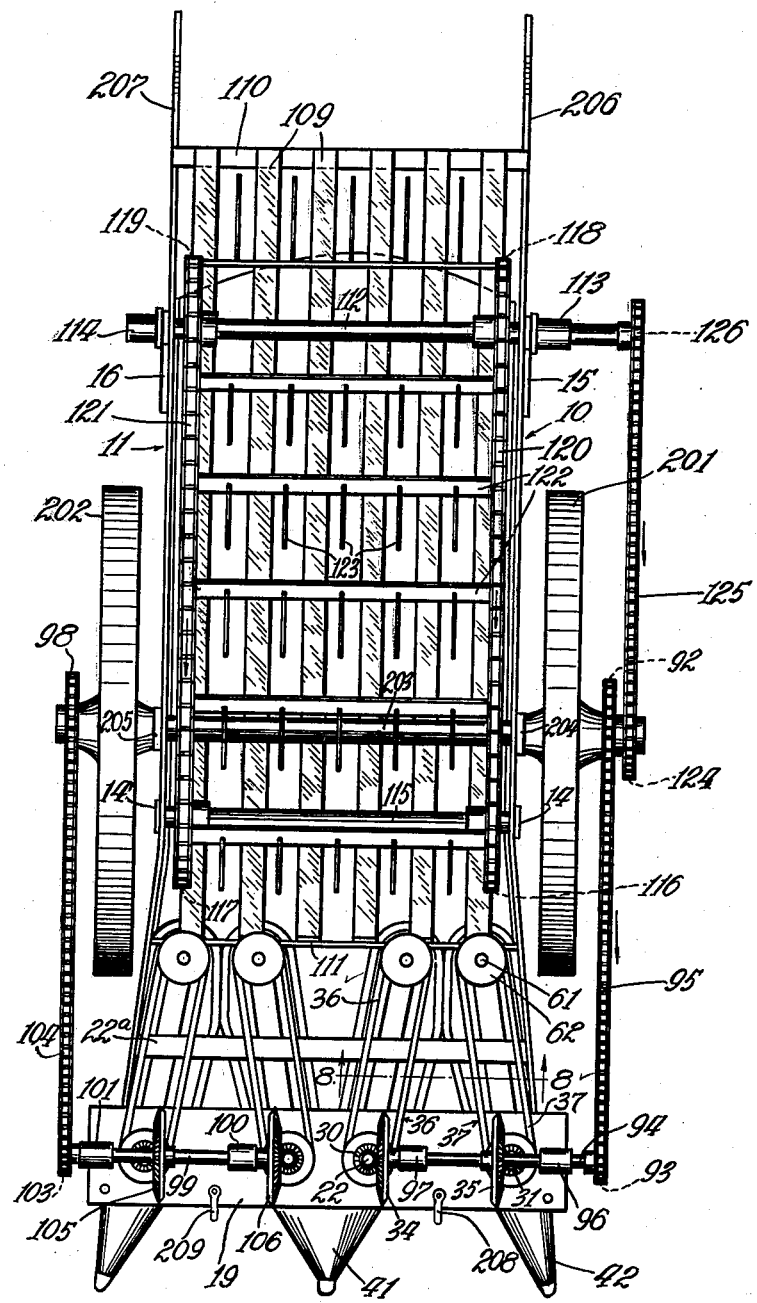
Fig. 2 is a plan view of the machine illustrated in Fig. 1.

Referring now to the drawings, and particularly to Figs. 1 and 2, it will be understood that the machine frame consists of identical fabricated side-frames 10 and 11. The side-frame 10 includes frame members 12 and 13 which converge forwardly where they meet and are joined together. The members 12 and 13 are connected by a nearly vertical cross piece 14 substantially midway between their forward and back ends. A vertical frame member 15 is suitably secured to the back ends of the members 12 and 13.

Side-frame member 11, Fig. 2, consists of opposed and similarly arranged parts corresponding to the members 12, 13, 14 and 15. Vertical member 16 which is opposed to vertical member 15 is shown in Fig. 2.

Cross bars 17 and 18 are provided at the back of the machine and are secured at their opposite ends respectively to the side-frames 10 and 11. At the front of the machine the side-frames 10 and 11 are bridged by a cross plate 19. Angle pieces 20, one of which is shown in Fig. 1, have their horizontal flanges (not shown) attached to opposite end portions of the cross plate 19 and have their vertical flanges secured to the respectively associated side-frames 10 and 11 by means of bolts 21. In Fig. 2 a cross piece 22a is shown secured at its opposite ends to the two side-frames 10 and 11.

The frame is supported upon ground wheels 201 and 202 which are freely rotatable upon opposite ends of an axle 203 which is anchored in frame pieces 204 and 205, Figs. 1 and 2, that are respectively fixed upon the side-frames 10 and 11. Handle bars 206 and 207 are also attached to the side-frame members. The machine may be manually pushed and guided by means of these handle bars and may be drawn through the field by draft means connected with either or both of the clevises 208 and 209 which are attached to the cross plate 19, Fig. 2.

The illustrated machine has two crop gathering assemblies at the front thereof, one assembly being provided for each of two rows which are to be harvested simultaneously. Since these assemblies are of identical structure, a detailed description of only one of them will be given. The assembly to be so described is that shown farthest to the right in Fig. 2, the details of which appear in Figs. 3, 4, 5, 7 and 8.

Figures 3, 7, 9:
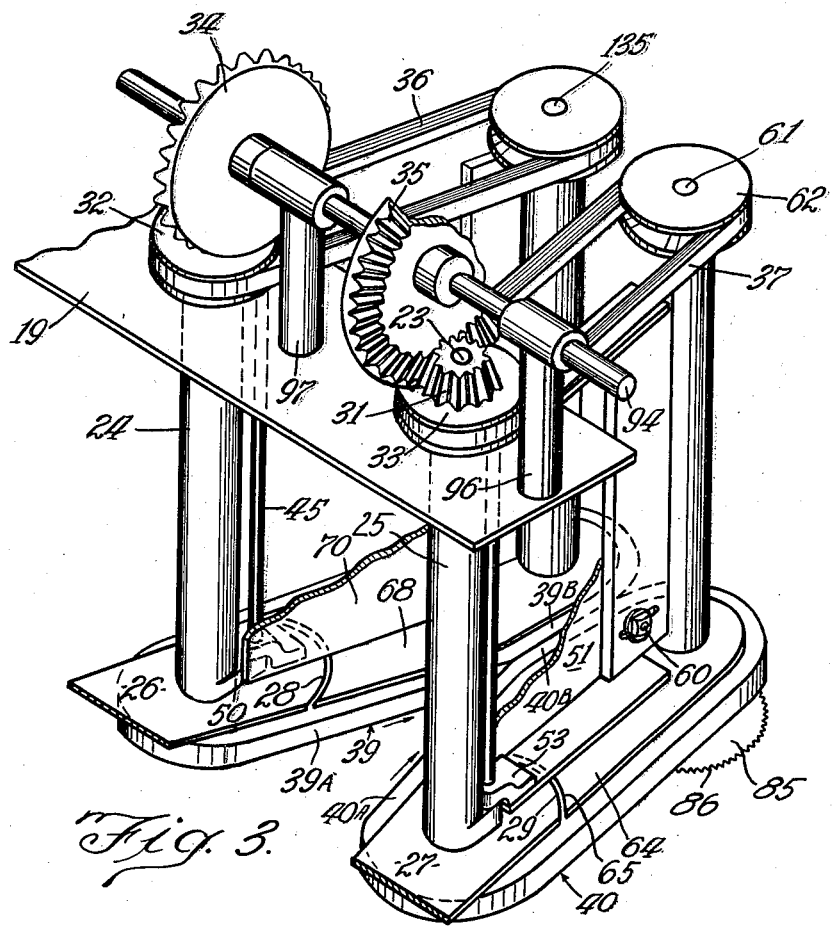
Fig. 3 is a perspective view of a stalk gathering assembly which forms a part of the machine.
Fig. 7 is a fragmentary view taken in perspective to illustrate a cutting knife arrangement employed in the present machine.
Fig. 9 is a plan view of a modified structure of stalk cutting knives that may be employed in the machine.

Referring now to Figs. 2 and 3, the crop gathering assembly there mutually shown includes vertical shafts 22 and 23 which extend through and are journalled in vertical sleeves 24 and 25. The sleeves 24 and 25 are anchored at their upper ends to the cross plate 19 which has apertures therein (not shown) for receiving the upper ends of the shafts 22 and 23. Sleeves 24 and 25 carry horizontally disposed guard plates 26 and 27 upon their lower ends, these plates being provided with arcuate back end sections 28 and 29 to accommodate pivotal movement of parts presently to be described. Shafts 22 and 23 have gears 30 and 31 splined or keyed to their upper end sections as well as pulleys 32 and 33. Said gears 30 and 31, during operation of the machine, are driven respectively from gears 34 and 35. The pulleys 32 and 33 are provided with V grooves for receiving and transmitting driving force to endless belts 36 and 37.

Identical pulleys as 38 are carried non-rotatively upon the lower end sections of the shafts 22 and 23 below the plates 26 and 27. These pulleys as 38 have respectively mounted thereon crop gathering belts 39 and 40 for driving the same. Said belts 39 and 40 are rotated in the direction indicated by the arrows in Fig. 3 so that the opposed and converging flights thereof engage and hold the crop during severance from its lower stalk portions by knife means subsequently to be described.

Figure 6:
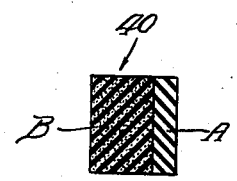
Fig. 6 is an enlarged cross sectional view of one of the stalk gathering belts employed in the present machine.

In Figs. 6 and 7 it will be seen that the belts as 40 are composite in structure, there being a strong firm layer A for engaging and receiving tractive force from the pulleys as 38 and a thicker resilient and comparatively soft layer B for engaging the crop in a manner to avoid crushing or bruising the same. For example, layer A may be reinforced with fabric whereas layer B may be ordinary unreinforced soft vulcanized rubber or sponge or foam rubber.

Shoes 41 and 42 secured respectively to the sleeves 24 and 25 and to the guard plates 26 and 27 are operative to pass beneath low stalks and leaves and lift the same for guiding them into the space between the opposed flights of the belts 39 and 40. It will be noted in Fig. 2 that the shoe 41 is attached both to the sleeve 24, Fig. 3, and to the corresponding sleeve in the left-hand crop gathering assembly, and that said shoe has both right and left edges arranged angularly to respectively guide the crop into the right-hand and left-hand crop gathering assemblies.

Figure 4:
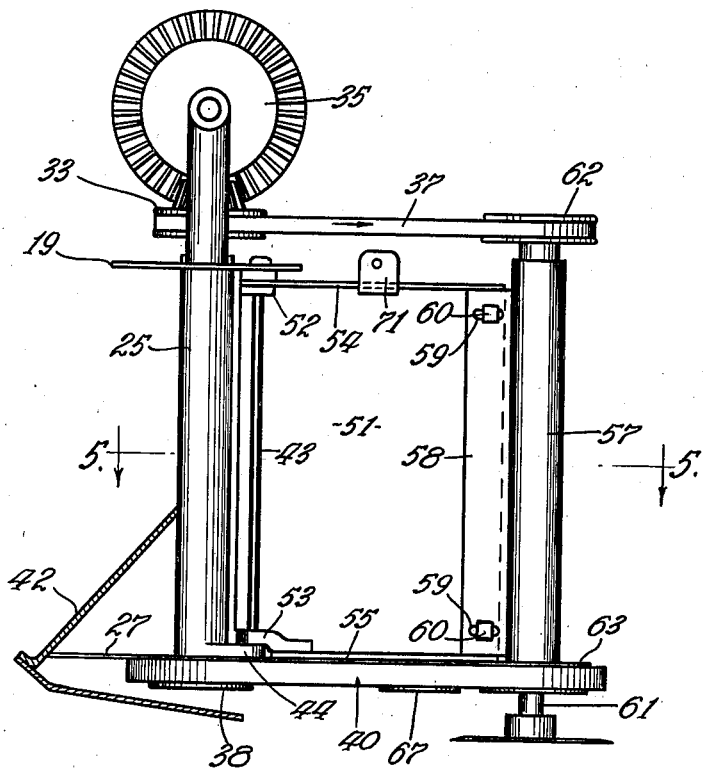
Fig. 4 is a side elevation of the stalk gathering assembly shown in Figs. 1 and 3.

Each assembly is so constructed and supported that the section at which the crop gathering belts 39 and 40 meet for gripping the crop can be adjusted laterally so as to cause the assemblies to squarely coincide with the crop rows. This construction and mode of support will now be described. In Fig. 4 a vertical pintle rod 43 is shown secured at its upper end to the cross plate 19 and at its lower end to an ear 44 which projects backwardly from the sleeve 25. A similar rod, 45, is secured in its lower end to an ear 50 on the sleeve 24 and at its upper end to the plate 19. These rods 43 and 45 serve as pivotal supports for back portions of the gathering assembly whereby these back portions may be adjusted laterally with respect to one another. A vertically disposed plate 51 is provided with brackets 52 and 53 at its forward edge and which are apertured to pivotally receive sections of the rod 43. This plate 51 is provided at its upper and lower edges with out-turned flanges 54 and 55 to which the brackets 52 and 53 are respectively secured.

At its back edge section the pivoted plate 51 carries a sleeve 57, such sleeve having a forwardly projecting rib 58 provided with elongated apertures 59 which receive the shanks of bolts 60 anchored in the plate 51. A shaft 61 is rotatively carried in the sleeve 57, there being pulleys 62 and 63 respectively upon upper and lower end sections of the shaft 61 for carrying the back parts of the belts 37 and 40. Vertical displacement of the shaft 61 is prevented by the pulleys 62 and 63 abutting against the ends of the sleeve 57. The tension of the belts 37 and 40 may be adjusted by loosening the bolts 60 whereby the sleeve 57 and the shaft 61 and pulleys 62 and 63 may be selectively adjusted radially of the pulleys 33 and 38. After the adjustment is made it may be maintained by again tightening the bolts 60.

Figure 5:
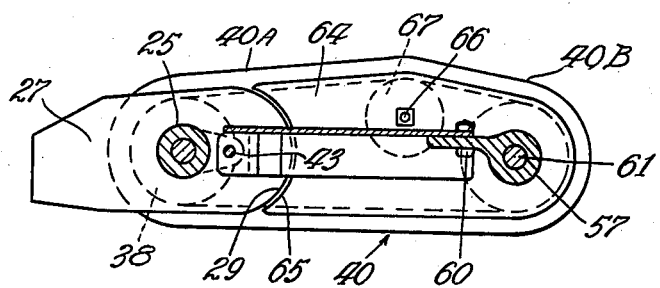
Fig. 5 is a cross sectional view taken on the line 5—5 of Fig. 4.

A dust and debris guard plate 64, Figs. 3 and 5, is attached to the lower end of the sleeve 57. This guard plate 64 has a forward arcuate edge 65 struck at the same radius as the arcuate edge 29 on the plate 27 so that the plates 27 and 64 form a substantially continuous plate while permitting pivotal movement of those parts carried by the vertical plate 51 about an axis in the rod 43.

Plate 64 has a stub bearing 66 anchored to its under side and projecting downwardly for carrying an idler pulley 67. Said pulley is so disposed and is of such a diameter as to project the conveyor flight of the belt outwardly, whereby there is provided upon such flight of the belt a straight section 40A in converging relation with a similar section 39A on the belt 39 and a section 40B presented contiguously with a similar section 39B on the belt 39. An idler pulley (not shown) is mounted beneath the guard plate 68 to press the conveyor flight of the belt 39 outwardly for effecting the sections 39A and 39B. In fact, all apparatus carried by the pivotally supported plate 70, which corresponds to the plate 51, is identical with that carried upon the plate 51 with the exception that some of the parts are left-hand instead of right-hand.

Pivotal adjustment of the plates 51 and 70 is accomplished by means illustrated in Fig. 8. In this figure the plates 51 and 70 are shown to have brackets 71 and 72 secured to their upper flanges as 54. The upstanding section of each of these brackets is apertured for respectively receiving bolts 73 and 74 which are adapted for sliding movement therein. Bolt 73 is anchored in a lug 75 which is connected with the frame cross bar 22a by means of a bolt 76, whereas the bolt 74 is anchored in a lug 77 secured to the cross bar 22a by means of a bolt 78. Compression springs 79 and 80 normally press the brackets 71 and 72 firmly against the lugs 75 and 77 wherefore the pivotal positions of the plates 51 and 70 may be changed by reattaching the bolts 76 and 78 selectively along the cross bar 22a. Apertures are provided in the bar 22a for this purpose. The bolt 76 is shown in an aperture 79 in the cross bar 22a, but may be removed and reinserted in either of the apertures 80 or 81. Similarly, the bolt 78 is shown in an aperture 82 in the cross bar 22a but may be removed and reinserted in either of the apertures 83 or 84.

Repositioning of the bolts 76 and 78 in different apertures of the cross bar 22a is for the purpose of changing the spacing between the gathering belts of the two crop gathering assemblies (the right-hand and left-hand assemblies illustrated in Fig. 2) so that such spacing will correspond with the distance between crop rows. Since the conveyor flights of the belts as 39 and 40 in each of these two assemblies are to remain in contiguous relation at the back sections thereof, the spacing of the bolts as 76 and 78 pertaining to the individual assemblies is not likely to be changed. Therefore, when an adjustment is to be made for differently spaced crop rows incident to which change the bolt 76 may be removed into aperture 80, the bolt 78 will be removed a like distance in the same direction into aperture 83. If adjustment should be made for the accommodation of more widely spaced crop rows wherefore the bolt 76 is removed into the aperture 81, the bolt 78 will be moved a like distance in the same direction into the aperture 84.

The springs 79 and 80 bearing against the brackets 71 and 72 yieldingly maintain the opposed conveyor flights of the belts 40 and 39 in their contiguous relation, but because of the yieldable character of these springs, such sections of the belt are separable incident to moving the plates 51 and 70 apart while compressing said springs. The springs 79 and 80, during normal operation of the machine are sufficiently strong to maintain the contiguous belt section substantially together, but will yield to permit separation of these belt sections when hard foreign objects such as stones may pass therebetween.

In Fig. 7 a disc knife 85 is shown upon and rotatable with the lower end of vertical shaft 61. Said knife 85 has a serrated edge 86. A complementary knife 87 is secured to a bracket 88, Fig. 7, and has a hook-shaped cutting edge 89 disposed adjacently to and in overlapping relation with the edge 86 of the knife 85. Said bracket 88 is mounted on the under side of the guard member 68. The peripheral edge 86 of the disc knife 85 and the cutting edge of the knife 87 meet at a point in substantial vertical alignment with the contiguous sections of the belts 39 and 40. During machine operation the belts 39 and 40 are rotated at such speed that the linear speed of the conveyor flights relatively to the machine is substantially the same as the forward speed of the machine relatively to the ground wherefore said flights remain substantially stationary relatively to the ground. These flights are therefore adapted to grip and to hold the crop while the knives 85 and 87 are advanced with the machine for severing such crop from its root portions. Furthermore, since the belts 39 and 40 are inclined upwardly from front to back, the contiguous portions of said belts are elevated as the machine advances whereby the crop gripped thereby is lifted to enable the knives to sever the stalks at lower sections than otherwise. With continued forward movement of the machine the conveyor flights discharge the severed crop into the bottom of a loading chute 91, Fig. 1.

Means for driving the gathering assemblies will now be described. Ground wheel 201 carries a sprocket 92 upon its hub for rotation therewith. This sprocket 92 is in alignment with a sprocket 93 carried non-rotatively upon a shaft 94 at the front of the machine. A driving chain 95 is carried by the sprockets 92 and 93. The shaft 94 is journalled in bearing standards 96 and 97 which are mounted upon the upper face of the cross plate 19. In addition to the sprocket 93 the shaft 94 carries the bevelled gears 34 and 35 which are meshed respectively with the gears 30 and 31 upon the upper ends of the vertical shafts 22 and 23, Figs. 2 and 3.

In Fig. 2 it will be observed that forward movement of the machine will cause rotation of the ground wheel 201 in such a direction that the upper flight of the chain 95 will be moved forwardly relatively to the machine whereby the gear 35 is rotated in such a direction as to cause clockwise rotation of the gear 31 and the shaft 23 upon which this gear is mounted. Consequently, because of the operative connection between the pulleys 33 and 62 established by the belt 37 the shaft 61 will also be rotated clockwise, Figs. 2 and 3. Therefore the pulleys 38 and 63 upon the lower end sections of the shafts 23 and 61 will cause rotation of the crop gathering belt 40 in the direction indicated by the arrow alongside thereof in Fig. 3. The relative diameter of the sprockets 92 and 93 and of the gears 35 and 31 and of the gears 34 and 30 is such that the opposed backwardly moving flights of the belts 39 and 40 will move backwardly at substantially the same rate of speed relatively to the machine as the forward ground speed of said machine. It follows that these sections have no substantial forward or backward movement with respect to the ground but simply close upon the crop and remain immovable in gripping relation with respect thereto.

The power train for driving the left-hand gathering assembly, Fig. 2, is similar to that just described for driving the right-hand assembly. The hub of ground wheel 202 non-rotatively carries a chain sprocket 98. A shaft 99 carried by bearings 100 and 101 on the cross plate 19 presents a sprocket 103 in alignment with the sprocket 98. A chain 104 is provided for driving the sprocket 103 from the sprocket 98 when the ground wheel 202 is rotated incident to forward movement of the machine. Consequently the gears 105 and 106 on shaft 99 are enabled to drive the parts of the left-hand crop gathering assembly in the same manner as the gears 34 and 35 drive the parts of the right-hand crop gathering assembly.

The backwardly and upwardly directed chute 91 hereinabove referred to has side members 107, one of which is shown in Fig. 1, and a bottom member 108. This chute 91 has an open top excepting for a plurality of spaced apart bars 109 which are secured at their upper ends to a cross bar 110 (attached to the handle bars 206 and 207) and at their lower ends to a cross bar 111, Figs. 1 and 2.

Means for conveying the severed crop upwardly through the chute 91 will now be described. This conveyor means comprises a shaft 112 extending transversely of the machine frame and journalled in bearing members 113 and 114 which are respectively secured to the side-frames 10 and 11. More specifically, the bearing members 113 and 114 are mounted upon the upright frame members 15 and 16; see Fig. 1. The vertical cross pieces 14 and 14' non-rotatively hold a cross shaft 115 in place in the lower part of the frame. Sprockets 116 and 117 disposed rotatively upon the fixed shaft 115 are in respective alignment with the sprockets 118 and 119 fixed to the rotatable shaft 112. Sprockets 116 and 118 carry a chain 120, whereas the sprockets 117 and 119 carry a chain 121. Cross bars 122 extend between and are carried by the chains 120 and 121. Each of the cross bars has a plurality of fingers 123, Figs. 1 and 2, projecting normally outwardly with respect thereto, said fingers being aligned with the spaces between the bars 109 covering the chute 91.

During operation of the machine while the ground wheels 201 and 202 are being rotated, a sprocket 124 disposed non-rotatively upon the hub of the wheel 201, drives a chain 125 which in turn through a sprocket 126 disposed non-rotatively upon the rotatable shaft 112 drives said shaft. Thus the chain conveyor comprising chains 120 and 121, the cross pieces or slats 122 and the fingers 123 is caused to rotate in the direction indicated by the arrow in Fig. 1.

The severed crop portions deposited by the belts as 39 and 40 of the crop gathering assemblies upon the lower bottom portion of the chute 91 are engaged by the fingers 123 of the conveyor belt and carried by these fingers upwardly through the chute from which the crop is discharged and permitted to drop into a suitable receptacle such as a basket 127, Fig. 1. During such rotation of the conveyor the bars 109 confine the crop within the chute 91 and provide a rest for the cross bars 122 traveling in the lower flight of the belt.

Support means for the receptacle 127 may be provided in the form of L-shaped bars 128 having vertical legs 129 and horizontal legs 130. The horizontal legs 130 are spanned by cross members 131 which provide a suitable support for the receptacle 127. Hooks 132 are provided at the upper ends of the legs 129 for attaching to the frame cross bar 17. The support member 128 is easily detached from the machine by lifting the same for removing the hooks from their connection with the cross bar 17.

An alternative arrangement of crop cutting knives is illustrated in Fig. 9. In this figure the rotatable disc knife 85' corresponds to the previously described knife 85 and is rotatable with the shaft 61. A similar disc knife 134 is non-rotatively connected with the shaft 135 and takes the place of the fixed knife 87 shown in Fig. 7.

I claim:

1. A crop harvesting machine comprising substantially parallel and upright fore and aft shafts, bearing means on said machine rotatably holding the fore shaft, bearing means rotatively holding the aft shaft, adjustable extension means pivotally connected with the machine adjacently to the fore bearing means for movement about a vertical axis and in support of the aft bearing means, a pair of pulleys respectively driven by and disposed about the lower end portions of said shafts, an endless crop gathering belt disposed upon said pulleys and presenting a conveyor flight, abutment means having a portion in opposed contiguous relation with the conveyor flight of said belt, a knife driven by and disposed about the lower end section of the aft shaft below the pulley thereon, the cutting edge of said knife projecting into substantial vertical alignment with the contiguous portion of said abutment means, driving means for rotating the fore shaft, means for driving the aft shaft from the fore shaft and so constructed and arranged that said belt receives driving force from each of said pulleys, and means yieldingly tending to pivot said extension means for maintaining pressure between the contiguous portions of said belt and said abutment means.

2. A crop harvesting machine comprising a pair of laterally spaced upright fore shafts journalled for rotation about their principal axes, a pair of laterally spaced upright aft shafts respectively to the rear of the fore shafts, journal members respectively carrying said aft shafts, a pair of adjustable extension means pivotally secured to said machine respectively adjacently to said fore shafts for pivotal movement about vertical axes and respectively in support of said journal members, fore shaft pulleys respectively driven by and disposed about lower end portions of said fore shafts, aft shaft pulleys respectively driven by and disposed about lower end portions of said aft shafts, endless crop gathering belts each disposed mutually about one of the fore shaft pulleys and the aft shaft pulley to the rear thereof, said belts presenting opposed complemental conveyor flights toward one another, means for maintaining said extension means extended for providing tautness in said belts, means yieldingly urging said extension means to turn about their pivots to place said opposed sections of the belts in contiguous relation, means for rotating the fore shafts, and means driven by said fore shafts for rotating the aft shafts, and each of said rotating means being effective for imparting such rotation to the shafts driven thereby that the pulleys thereon cause rotation of the belts in such a direction that the opposed conveyor flights thereof travel from front to back.

3. A harvesting machine as set forth in claim 2, and wherein knives are respectively carried upon said extension means adjacent to said belts, and wherein the cutting edges of said knives include horizontal forwardly directed portions disposed in overlapping relation at a point in substantially vertical alignment with the contiguous sections of said belts.

4. A harvesting machine as set forth in claim 2, and wherein disc knives are respectively carried upon lower end portions of the aft shafts for rotation therewith, and wherein the cutting edges of said knives include horizontal forwardly directed portions disposed in overlapping relation at a point in substantially vertical alignment with the contiguous sections of said belts.

5. A machine for harvesting a leaf-bearing row crop, comprising a frame, crop shearing means carried in such a position upon said frame as to coincide with stalk portions of the crop at substantially the ground level when the machine is caused to traverse a crop row, a pair of crop gathering belts having opposed and contiguous flights directed backwardly and upwardly from a position near the ground level and forwardly of the crop shearing means to a position above and rearwardly of said shearing means, means for sliding beneath and lifting low leaves of the crop while said flights of the belts are advanced into position for gripping the plant stalk portions beneath such leaves, and means for rotating said belts at such speed and in such a direction that said flights have substantially no forward or backward movement relatively to the crop row but are moved upwardly and rearwardly relatively to the machine whereby the contiguous portions of the belts grip and lift the crop for guiding lower stalk portions thereof into the shearing means and for discharging the thus severed leaf portion of the crop rearwardly of said shearing means.

6. A row crop harvesting machine, comprising a frame, crop shearing means carried upon said frame in a position to coincide with stalk portions of the crop slightly above the ground level while the machine traverses a crop row, a pair of crop gathering belts having opposed flights directed backwardly and upwardly from a position near the ground level and forwardly of the crop shearing means to a position above and rearwardly of said shearing means, said belt flights being spread apart at their forward portions and converging into co-engagement at rearward portions, and means for rotating said belts at such speed and in such a direction that said flights have substantially no forward or backward movement relatively to the crop row but are moved upwardly and rearwardly relatively to the machine whereby the contiguous portions of the belts grip the crop for guiding lower stalk portions thereof into the shearing means and for discharging the thus severed leaf portion of the crop rearwardly of said shearing means.

7. A crop harvesting machine comprising substantially parallel and upright rotatable shafts of which one is journalled for rotation in a predetermined position with respect to said machine, journal means carrying the other shaft and adjustable substantially circumferentially of the one shaft, means for restraining said journal means within selected positions of such adjustment, a pair of pulleys respectively driven by and associated with said shafts near their lower ends, an endless crop gathering belt disposed upon said pulleys, abutment means in opposed cooperative crop gripping relation with the conveyor flight of said belt, and means for rotating both of said shafts to transmit driving force to the belt through each of said pulleys.

8. A crop harvesting machine as in claim 7 and wherein a crop shearing disc knife is disposed upon the shaft carried in the adjustable journal means, said knife being upon said shaft at a section immediately below the crop gathering belt and of a diameter to project at least to a position in substantial vertical alignment with the portion of the conveyor flight of said belt that is in contiguous relation with said abutment means.

9. A crop harvesting machine comprising substantially parallel and upright fore and aft shafts of which the fore shaft is journalled for rotation in a fixed position with respect to said machine, journal means carrying the aft shaft and adjustable substantially circumferentially of the fore shaft, means yieldably holding said journal means in selected positions of such adjustment, a pair of pulleys respectively driven by and disposed about the lower end portions of said shafts, an endless crop gathering belt disposed upon said pulleys, abutment means in opposed relation with the conveyor flight of said belt, and means for rotating both of said shafts for transmitting driving force to the belt through each of said pulleys.

10. A crop harvesting machine comprising a pair of laterally spaced upright fore shafts journalled for rotation about their principal axes, a pair of laterally spaced upright aft shafts respectively to the rear of the fore shafts, journal members respectively carrying said aft shafts, and pivotally secured to said machine to provide for adjustment of the aft shafts substantially circumferentially of their respective fore shafts, means yieldably holding said journal means in selected positions of such adjustment, fore shaft pulleys respectively driven by and disposed about lower end portions of said fore shafts, aft shaft pulleys respectively driven by and disposed about lower end portions of said aft shafts, endless crop gathering belts each disposed mutually about one of the fore shaft pulleys and the aft shaft pulley to the rear thereof, said belts presenting opposed complemental conveyor flights toward one another, and means for transmitting driving force of each of said pulleys through their shafts and in a direction to cause rotation of the belts in the direction in which the opposed conveyor flights travel from front to back.

WILLIAM E. URSCHEL.